United States Patent [19]

Thangadurai et al.

[11] Patent Number: 5,745,770
[45] Date of Patent: Apr. 28, 1998

[54] METHOD AND APPARATUS FOR SERVICING SIMULTANEOUS I/O TRAP AND DEBUG TRAPS IN A MICROPROCESSOR

[75] Inventors: George Thangadurai, Folsom; Chih-Hung Chung, Santa Clara, both of Calif.

[73] Assignee: Intel Corporation, Santa Clara, Calif.

[21] Appl. No.: 595,187

[22] Filed: Feb. 1, 1996

Related U.S. Application Data

[63] Continuation of Ser. No. 174,032, Dec. 27, 1993, abandoned.

[51] Int. Cl.[6] .................................................. G06F 9/46
[52] U.S. Cl. ........................... 395/733; 395/737; 364/230
[58] Field of Search ................................... 395/733–742

[56] References Cited

U.S. PATENT DOCUMENTS

| | | | |
|---|---|---|---|
| 4,352,157 | 9/1982 | Namimoto et al. | 395/725 |
| 4,719,565 | 1/1988 | Moller . | |
| 4,809,157 | 2/1989 | Eilert et al. | 395/650 |
| 4,841,439 | 6/1989 | Nishikawa et al. | 395/375 |
| 4,930,070 | 5/1990 | Yonekura et al. | 395/725 |
| 5,101,497 | 3/1992 | Culley et al. | 395/725 |
| 5,161,226 | 11/1992 | Wainer | 395/650 |
| 5,193,158 | 3/1993 | Kinney et al. | 395/375 |
| 5,201,039 | 4/1993 | Sakamura | 395/375 |
| 5,287,523 | 2/1994 | Allison et al. | 395/725 |
| 5,317,745 | 5/1994 | Chan | 395/700 |
| 5,339,437 | 8/1994 | Yuen | 395/700 |
| 5,349,667 | 9/1994 | Kaneko | 395/725 |
| 5,363,506 | 11/1994 | Fukuoka | 395/725 |
| 5,369,770 | 11/1994 | Thomason et al. | 395/725 |
| 5,386,563 | 1/1995 | Thomas | 395/650 |
| 5,392,435 | 2/1995 | Masui et al. | 395/725 |
| 5,410,715 | 4/1995 | Ishimoto et al. | 395/775 |

OTHER PUBLICATIONS

Intel486™ SX Microprocessor Data Book; a publication of Intel Corporation, Aug., 1992.

*Primary Examiner*—Ayaz R. Sheikh
*Assistant Examiner*—Paul R. Myers
*Attorney, Agent, or Firm*—Blakely, Sokoloff, Taylor & Zafman

[57] ABSTRACT

A microprocessor includes the capability to service at least one debug exception and an I/O trap generated during execution of a single instruction. After executing each instruction, the microprocessor determines whether a debug exception and an I/O trap occurred. If at least one debug exception and an I/O trap exist, then the microprocessor determines an active status for the debug exception. The microprocessor stores the contents of internal registers, constituting a state of the microprocessor, to memory, and latches a breakpoint status for the debug exception in a public debug status register. The breakpoint status is preserved by copying the breakpoint status to a private debug status register. The microprocessor services the I/O trap by executing a SMM handler, an upon returning from the SMM handler, the state of the microprocessor is restored. If the I/O trap serviced requires instruction restart, then the state of the microprocessor is adjusted to re-execute the instruction. The microprocessor copies the breakpoint status, stored in the private debug status register, to the public debug status register when the I/O trap does not require instruction restart. The debug exception is subsequently serviced by executing an INT1 handler.

18 Claims, 6 Drawing Sheets

| Bits 31–24 | Bits 23–16 | Bits 15–14 | 13 | 12–9 | 8 | 7 | 6 | 5 | 4 | 3 | 2 | 1 | 0 | |
|---|---|---|---|---|---|---|---|---|---|---|---|---|---|---|
| LEN3 · R/W3 · LEN2 · R/W2 | LEN1 · R/W1 · LEN0 · R/W0 | 0 0 | 0 | 0 0 0 0 | GE | LE | G3 | L3 | G2 | L2 | G1 | L1 | G0 | L0 | DR7 |
| 0 0 0 0 0 0 0 0 | 0 0 0 0 0 0 0 0 | BT BS | BD | 0 0 0 0 | 0 | 0 | 0 | 0 | 0 | B3 | B2 | B1 | B0 | DR6 |
| RESERVED | | | | | | | | | | | | | | DR5 |
| RESERVED | | | | | | | | | | | | | | DR4 |
| BREAKPOINT 3 PHYSICAL ADDRESS | | | | | | | | | | | | | | DR3 |
| BREAKPOINT 2 PHYSICAL ADDRESS | | | | | | | | | | | | | | DR2 |
| BREAKPOINT 1 PHYSICAL ADDRESS | | | | | | | | | | | | | | DR1 |
| BREAKPOINT 0 PHYSICAL ADDRESS | | | | | | | | | | | | | | DR0 |

METHOD AND APPARATUS FOR SERVICING SIMULTANEOUS I/O TRAP AND DEBUG TRAPS IN A MICROPROCESSOR

This is a continuation of application Ser. No. 08/174,032, filed Dec. 27, 1994, now abandoned.

FIELD OF THE INVENTION

The present invention relates to the field of computer systems, and more particularly to computer systems having a microprocessor capable of handling debug exceptions and I/O traps generated from a single instruction.

BACKGROUND OF THE INVENTION

In general, computer systems contain microprocessors that control the operation of the computer system. In order to provide functionality to the computer systems, computer programmers develop application programs, including operating systems, for execution in the microprocessor. In order to develop the application programs for the computer systems, debug tools are commonly incorporated into the microprocessors. A typical debug function in a microprocessor permits the programmer to select an event related to the execution of the application program. Upon occurrence of the event in the microprocessor, the program halts, and the programmer is permitted to view the contents or state of internal registers in the microprocessor and associated memory. By viewing the contents of the internal registers and memory, a programmer can analyze operation of the program.

The events that the user selects to halt operation of the microprocessor for the debug function are known as debug exceptions. Typically, the debug exceptions include data and instruction breakpoints, wherein data breakpoints halt operation of the program when the microprocessor accesses a specified address in memory, and instruction breakpoints halt operation of the program when the microprocessor executes a specified instruction. In order to respond to the debug exception event, the microprocessor often executes a series of operations, entitled a debug exception service routine, in response to generation of the breakpoint. It is desirable to permit selection of more than one breakpoint, and consequently more than one breakpoint may occur during execution of a single instruction.

In addition to debug functions, portable personal computer systems typically implement a variety of hardware power control functions. The hardware power control functions may include hardware functions that power down unused peripherals, and place the processor and other circuitry in a reduced power state. These hardware power control functions increase battery life of the portable computer by minimizing power consumption. In order to control the hardware power functions, these portable computer systems implement system power management software. The system power management software usually determines conditions for power reduction, and enables the appropriate hardware power control function. For example, the system power management software may detect a reduction in accesses to a disk drive, and then spin down the disk drive to minimize power demands on the battery.

In an Intel® architecture microprocessor, the hardware and software support for the system power management for a portable computer system may be implemented via a system management interrupt mechanism. In general, the system management interrupt directs microprocessor execution to a system management interrupt service routine. The microprocessor functions in a system management mode while servicing the system management interrupt. The system management determines conditions for power reduction and enables the appropriate hardware power control function. The service routine for the system management mode is stored in a system management overlay memory accessible only while the processor is in the system management mode. The system management interrupt may be generated during execution of any instruction.

A computer system may employ both power memory management and debug function in a single microprocessor. Therefore, during execution of any particular instruction, a debug breakpoint and a system management interrupt may occur. In order to service the system management interrupt, microprocessors capture data and freeze internal registers in the microprocessor that contain information pertaining to the breakpoint. Consequently, when both a breakpoint and a system management interrupt occur during execution of the same instruction, execution of an interrupt service routine for the system management interrupt may result in loss of the breakpoint information for the debug breakpoint.

SUMMARY AND OBJECTS OF THE INVENTION

Therefore, it is an object of the present invention to provide a microprocessor capable of servicing debug exceptions.

It is another object of the present invention to provide a microprocessor capable of servicing an I/O trap.

It is a further object of the present invention to provide a microprocessor capable of servicing an I/O trap and debug exceptions occurring during execution of the same instruction.

These and other objects of the present invention are realized in a microprocessor that includes the capability to service at least one debug exception and an I/O trap generated during execution of a single instruction. In a preferred embodiment, the microprocessor is an Intel® architecture microprocessor, and is implemented in a computer system incorporating power management. In order to implement the power management system, the microprocessor includes a system management mode (SMM). The SMM in the microprocessor is invoked via a system management interrupt (SMI). The SMI occurs due to either a system event or an I/O trap. If the SMI was generated due to the execution of an I/O instruction, then the SMI causes a synchronous I/O trap in the microprocessor. In addition, the microprocessor contains a debug function that generates debug exceptions upon occurrence of specified criteria. In the microprocessor, the SMI has a higher service priority than the debug exceptions.

After executing each instruction, the microprocessor determines whether a debug exception and a SMI occurred. If at least one debug exception and an I/O trap exist, then the microprocessor determines an active status for the debug exception. The microprocessor stores the contents of internal registers, constituting the state of the microprocessor, to memory. In a preferred embodiment, the microprocessor allocates a system management random access memory (SMRAM) for operation of the SMM. The microprocessor then latches a breakpoint status for the debug exception in a public debug status register. The breakpoint status provides information for the debug exception. In order to preserve the breakpoint status when servicing the I/O trap, the microprocessor copies the breakpoint status to a private debug status register. The private debug status register resides in the SMRAM. In addition, the microprocessor specifies the debug exception type.

After preserving the debug breakpoint status, the microprocessor services the SMI by executing a SMM handler. Upon returning from the SMM handler, the state of the microprocessor is restored. If the SMI was due to an I/O trap and the I/O trap serviced requires instruction restart, then the state of the microprocessor is adjusted to re-execute the instruction. In order to service the debug exception pending, the microprocessor copies the breakpoint status, stored in the private debug status register, to the public debug status register when the I/O trap does not require instruction restart. The debug exception is subsequently serviced by executing an INT1 handler.

Other objects, features and advantages of the present invention will be apparent from the accompanying drawings, and from the detailed description that follows below.

BRIEF DESCRIPTION OF THE DRAWINGS

The objects, features, and advantages of the present invention will be apparent from the following detailed description of the preferred embodiment of the invention with references to the following drawings.

DETAILED DESCRIPTION

Methods and apparatus for servicing a debug exception and I/O trap in a microprocessor that occur during execution of a single instruction are disclosed. In the following description, for purposes of explanation, specific nomenclature is set forth to provide a thorough understanding of the present invention. However, it will be apparent to one skilled in the art that these specific details are not required to practice the present invention. In other instances, well known circuits and devices are shown in block diagram form to avoid obscuring the present invention unnecessarily.

Figure 1:
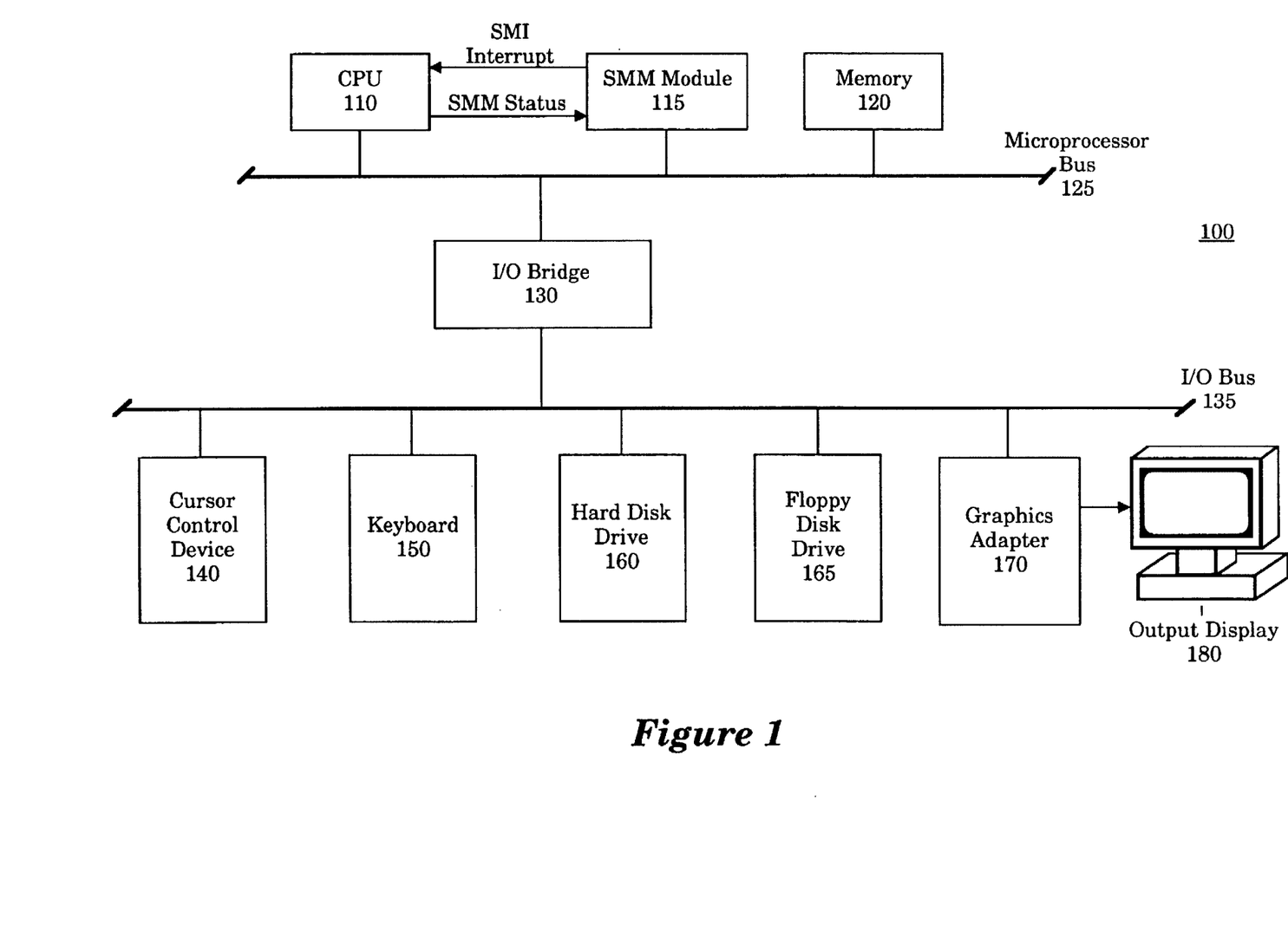
FIG. 1 illustrates a high level diagram of a computer system incorporating the I/O trap and debug exception handling system of the present invention.

Referring to FIG. 1, a high level diagram of a computer system incorporating the I/O trap and debug exception handling system of the present invention is illustrated. A computer system 100 contains a central processing unit (CPU) 110 and memory 120. The CPU 110 and memory 115 are coupled via a microprocessor bus 125. In addition, the computer system 100 contains an input/output (I/O) bus 135 to interface I/O peripheral devices to the computer system 100. The microprocessor bus 120 and I/O bus 135 are coupled via an I/O Bridge 130. The computer system 100 also contains a plurality of I/O peripheral devices including a cursor control device 140, a keyboard 150, a hard disk drive 160, a floppy disk drive 165, and a graphics adapter 170. The I/O peripheral devices 140, 150, 160, 165 and 170 communicate with the CPU and other bus master peripheral devices, via the I/O bus 135. The I/O graphics card 180 controls the operation of an output display device 180. The memory 120, I/O Bridge 130, microprocessor bus 125, I/O bus 135, I/O peripheral devices 140, 150, 160, 165 and 170, and output display 180 are those components typically found in a computer system, and are intended to represent a broad category of data processing systems which are well known in the art and will not be described further.

In a preferred embodiment of the present invention, the CPU 110 comprises an Intel® architecture microprocessor. The microprocessor 110 contains a system management mode (SMM). The SMM is a distinct operating mode for the microprocessor 110. As an operating mode, the SMM contains distinct microprocessor environment, interface, hardware and software features. In order to provide the hardware interface to the microprocessor 110 for the SMM, the computer system 100 contains a SMM module 115. The SMM of microprocessor 110 is invoked via a system management interrupt (SMI). As shown in FIG. 1, the SMM hardware interface comprises a SMM status line and an SMI interrupt line. The SMM status and SMI interrupt signals permit the microprocessor 110 to implement the SMM hardware interface. The SMI interrupt is generated by the SMM module 115. In a preferred embodiment, the microprocessor 110 comprises an SMI# pin for receiving the SMI interrupt signal. The microprocessor 110 also contains an SMIACT# pin used as a status indicator. The SMIACT# pin generates the SMM status so as to indicate to external hardware that the microprocessor 110 is operating in the SMM.

In addition to the SMM hardware interface, the microprocessor 110 utilizes a unique memory space, referred to as system management random access memory (SMRAM) to support the SMM. In a preferred embodiment, the SMRAM resides in memory 120, and stores a software interface including a SMM handler and control information for operation of the microprocessor 110 in the SMM. The SMRAM memory space is accessed through the microprocessor 110 physical address range of 30000–3FFFF hexadecimal (H). The software interface for the SMM of the microprocessor 110 also comprises a SRET routine. The SRET routine is utilized to exit the SMM, thereby permitting the microprocessor 110 to return to a previous operating mode. When entering the SMM, the microprocessor 110 saves the state information to the SMRAM memory space. When exiting the SMM, the microprocessor 110 executes the SRET routine. The function of the SRET routine is to restore the saved state information of the microprocessor 110 from the SMRAM memory space. In addition, the SRET routine indicates to the microprocessor 110 to exit the SMM. The previous example relates to switching the microprocessor to the SMM. In general, for purposes of explanation, an SMI interrupt for the microprocessor for servicing such an I/O peripheral device is entitled an I/O trap.

The SMM for the microprocessor 110 of the present invention has application for managing power consumption in a computer system, such as computer system 100. For example, a portable computer system may implement system power management software to control the power consumption for components contained within the computer system. Typically, the system power management software determines conditions for power reduction, and enables the appropriate hardware power control function. For example, the SMM module 115 may contain timers to monitor the frequency of access to an I/O peripheral device, such as the hard disk drive 160, within a specified time. The SMM module 115 monitors the microprocessor bus 125 to ascertain whether an access to the I/O peripheral device in the power management system occurs. If no accesses are attempted within the specified time period, the SMM module 115 generates a SMI interrupt to the microprocessor 110 indicating that a particular I/O peripheral device may be powered down. In response to the interrupt, the microprocessor 110 executes the SMM handler, stored in the SMRAM space, to reduce power consumption in the hard disk drive 160 by placing the hard disk drive 160 in a reduced power state. Subsequently, when access to the hard disk drive 160 is desired, the microprocessor 115 issues an I/O request to access the hard disk drive 160. The SMM module 115 detects the I/O access request and generates a SMI to the microprocessor 110. In response to the interrupt, the microprocessor 110 executes the SMM handler to switch the hard disk drive 160 from the reduced power state to a normal operating mode.

Upon generation of the SMI, the microprocessor 110 enters the SMM to service the SMI after completing execution of the current instruction. Consequently, when the microprocessor 110 returns from servicing the SMI, the instruction pointer points to the next instruction location subsequent to the current instruction. In general, if the current instruction contains no repeat prefix, then the internal registers of the microprocessor 110 are set to execute the next instruction upon completing execution of the current instruction. Alternatively, if the current instruction contains a fault, the internal registers of the microprocessor 110 are restored to a state held prior to execution of the current instruction.

The ability to restore the executed microprocessor 110 to the state held prior to execution of the previous executed instruction permits "instruction restart". In general, the microprocessor 110 utilizes instruction restart to handle exceptions that block access to operands. For example, if the microprocessor 110 initiates access to the hard disk drive 160, and the hard disk drive 160 is operating in a reduced power mode, then the microprocessor 110 re-initiates the I/O access subsequent to executing the SMM handler. However, at the time the SMI interrupt occurs, the instruction execution may have altered the contents of some of the microprocessor registers. Therefore, restoring the microprocessor state for the instruction issuing the I/O access permits instruction restart. When implementing instruction restart in the microprocessor, the instruction pointer is restored to point to the instruction that generated the I/O trap. Therefore, when the SMI handler returns, execution resumes in the microprocessor with the instruction that caused the I/O trap.

The microprocessor 110 of the present invention includes functionality for debugging application programs. In general, debugging features of the microprocessor provide the system programmer valuable tools for looking at the dynamic state of the microprocessor. The debugging functionality is provided through a plurality of debug registers. The debug registers hold the addresses of memory locations called breakpoints. The breakpoints identify conditions that, when detected in the microprocessor, trigger an exception. For example, the microprocessor may be configured to generate an exception when a memory operation is executed to one of the memory locations identified in the debug registers. The debug registers support both instruction breakpoints and data breakpoints. In addition, the microprocessor includes single step breakpointing which, when invoked, causes the microprocessor to break upon completing execution of each instruction. When the microprocessor generates a debug exception, a debug exception handler is invoked to service the debug exception.

Figure 2:
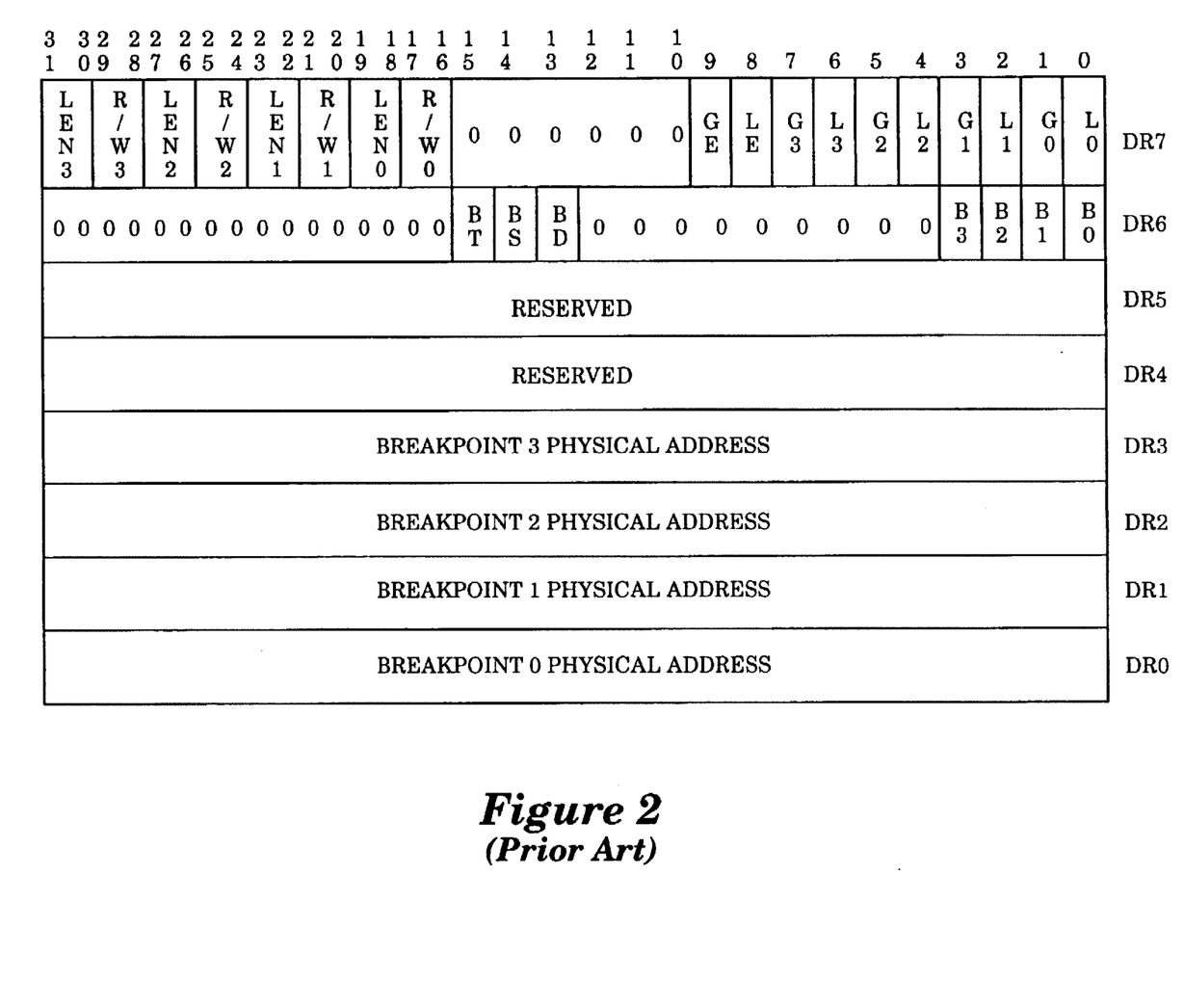
FIG. 2 illustrates a plurality of debug registers contained within an Intel® architecture microprocessor.

Referring the FIG. 2, a plurality of debug registers contained within an Intel® architecture microprocessor are illustrated. Debug address registers DR0–DR3 hold the linear address for one of the four breakpoints. In addition, each breakpoint condition is specified by the contents of a debug control register DR7. The DR7 register specifies the type of memory access associated with each breakpoint. Each address in registers DR0 to DR3 corresponds to a field R/W0 to R/W3 in the DR7 register. The R/W0 to R/W3 fields indicate the type of access for which an exception is desired (i.e. break on instruction execution only, break on data writes only, break on data reads only, or break on data writes but not instruction fetches). The LEN0–LEN3 fields in the DR7 register specify the size of the breakpoint location in memory. The lower 8 bits of the DR7 register (fields L0–L3 and G0–G3) individually enable the four address breakpoint conditions. The L0–L3, entitled local breakpoints, enable breakpoint conditions applicable to a single task. The global levels, G0–G3, enable breakpoint conditions applicable to all tasks in the system.

The DR6 register is a debug status register that reports conditions sampled at the time the debug exception was generated. In part, the DR6 debug status register indicates the breakpoint that triggered the exception. When an enable breakpoint generates a debug exception, a microcode program in the microprocessor loads the four bits of the debug status register, B0–B3, before invoking the debug exception handler. For a further explanation of the debug status register in Intel® architecture microprocessors, see i486 Microprocessor Programmers Reference Manual, Osborne, McGraw-Hill, 1990.

As described above, the microprocessor 110 of the present invention invokes debug exceptions upon detection of a breakpoint. Upon invoking a debug exception, the microprocessor 110 calls the debug exception handler called interrupt 1 (INT1) handler routine. In general, the INT1 handler is an interrupt service routine (ISR) that services the debug exceptions. When a debug exception is generated, the microprocessor 110 checks flags in the DR6 and DR7 debug registers to determine the condition causing the debug exception. A debug exception is classified as either a fault or a trap. A debug exception, caused by an instruction breakpoint, is classified as a fault because the microprocessor reports an instruction breakpoint before executing the corresponding instruction. In contrast, debug exceptions classified as traps are serviced subsequent to the execution of the instruction that invoked the debug exception.

A data breakpoint exception is classified as a trap because the microprocessor generates a debug exception for a data breakpoint after executing the instruction that accesses the corresponding breakpoint memory location. The microprocessor 110 of the present invention also supports a single step trap. The single step trap occurs after an instruction is executed if a TF flag was set prior to executing the instruction. In general, single step traps are utilized by a system debugger to analyze the state of the microprocessor upon execution of each instruction. The microprocessor clears the TF flag prior to calling the debug exception handler.

Figure 3:
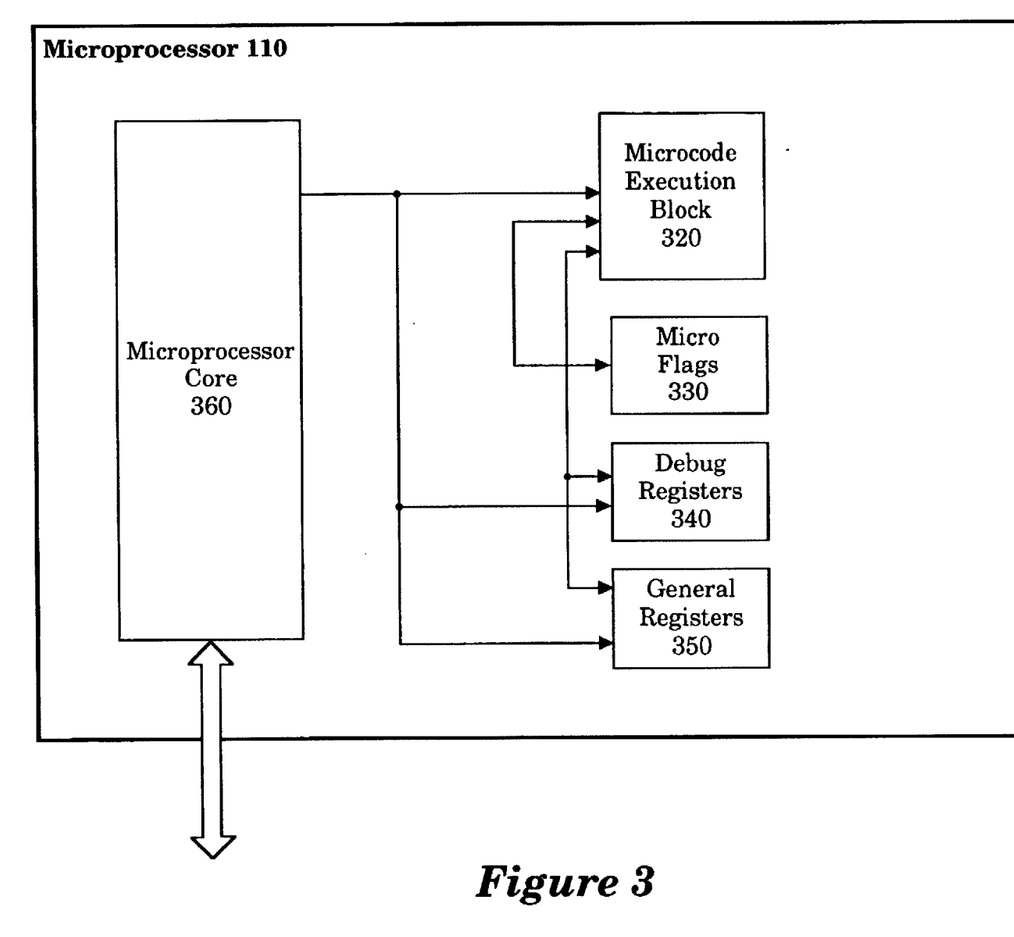
FIG. 3 illustrates a block diagram of a microprocessor incorporating the simultaneous I/O trap and I/O debug functions of the present invention.

Referring to FIG. 3, a block diagram of a microprocessor incorporating the simultaneous I/O trap and I/O debug functions of the present invention is illustrated. The microprocessor 110 comprises a microprocessor core 360. The microprocessor core 360 incorporates a variety of data processing functions including instruction fetch, instruction decode, instruction execution, a memory subsystem, to interface the microprocessor 110 to memory 120, and a bus interface. The microprocessor core 360 is intended to represent a broad category of microprocessor architectures, including an Intel® architecture microprocessor, and a reduced instruction set computer (RISC) microprocessors.

The microprocessor core 360 is coupled to a microcode execution block 320. The microcode execution block 320 includes a read only memory (ROM) for storing micro instructions. The micro instructions operate on the hardware of the microprocessor 110 to perform functions in accordance with an instruction set for the microprocessor 110. In addition, the microcode execution block 320 includes a micro instruction sequencer, for generating a micro instruction pointer, and decode logic for decoding the micro instruction read from the ROM. In operation, the microprocessor core 360 inputs information, such as a micro instruction pointer, to specify execution of microcode instructions in accordance with a particular macro instruction. The functional operation of microcode execution block 320 for servicing I/O traps and debug exceptions occurring in a single instruction is described fully below. The microcode execution block 320 is intended to represent a broad category of hardware support for implementing micro programs in data processing devices, which are well known in the art and will not be described further.

The microprocessor 110 includes debug registers 340 containing the debug registers DR0–DR7. The microprocessor also contains general registers 350. The general registers 350 comprise the architectural state for the microprocessor 110. For the Intel® architecture microprocessor, the general registers 350 comprise a plurality of 32 bit registers wherein the lower 16 bits are accessible for compatibility with the 8086 microprocessor. The microprocessor 110 also includes micro flags 330. In general, the micro flags 330 are utilized to control operations and indicate the status of the microprocessor. In a preferred embodiment of the present invention, the present invention utilizes SM flags located in the SMRAM. Whenever a system management (SM) slot in the SMRAM indicates presence or absence of a certain condition, then a SM flag is utilized. Whenever a special bit in the microprocessor core 360 indicates presence or absence of a certain condition, then a micro flag, residing in the micro flags 330, is utilized.

In an 80386 Intel® microprocessor, the servicing of debug exceptions and system management interrupts (SMI) contain the following priority: SMI, single step debug exception, debug code breakpoint/data breakpoint exceptions. Because the SMI contains a higher priority than debug exceptions, if a debug trap and a SMI occur during execution of the same instruction, then the SMM handler is invoked first. However, because the DR6 register is latched only when the debug exception is taken, the contents of the DR6 register are lost. Consequently, upon completion of the SMM handler, the debug exception is never taken.

If the service priorities are rearranged such that the SMI is not serviced first, then the instruction restart function is inoperative. For example, if the debug exception handler, INT1 handler, is entered first, then before the first instruction of the debug handler is executed, the SMI is serviced. Under this scenario, the instruction pointer points to the debug handler and not to the instruction after the I/O instruction generating the SMI. Consequently, if the instruction pointer is backed up to accommodate the instruction restart function, then a system crash occurs due to the attempted instruction restart of a non I/O instruction. Because a debug exception and SMI interrupt are considered traps on the previous instruction, the microprocessor does not preserve, across instruction boundaries, the state information required to service the debug exception. Therefore, servicing either the debug exception or SMI results in either the loss of the debug exception or SMI. The present invention provides a solution to preserve relevant state information of the microprocessor across instruction boundaries so as to permit servicing of SMIs and debug exceptions that occur during execution of the same instruction.

In general, SMI interrupts are classified into two types: asynchronous SMI and synchronous SMI. An asynchronous SMI occurs whenever a system event requires execution of the SMI handler, and the SMM module 115 asserts the SMI# signal. For example, an asynchronous SMI may occur when a timer in a SMM module reaches a terminal count so as to indicate potential for reducing power to a particular I/O peripheral device. A synchronous SMI is classified as an I/O trap. The synchronous SMI is caused by the execution of an I/O instruction that is synchronous to the instruction execution flow. Therefore, synchronous SMI typically involves restarting the trapped I/O instruction. For example, when the microprocessor issues a bus request to a device operating in a reduced power state, the SMM module 115 asserts the SMI# within a specific time window based on the particular bus protocol. In response, the microprocessor services the SMI, by invoking the SMI handler prior to resuming execution of a subsequent instruction.

Referring to Table 1, possible combinations of SMI and debug traps for an Intel® architecture microprocessor are shown. For asynchronous SMI, instruction restart is not required and, consequently, the conflict between the debug exception and SMI does not occur. For asynchronous SMI, the debug trap and SMI do not require any specific priority relative to each other. For most I/O instructions, invoking a SMI typically involves invoking a synchronous SMI. The synchronous SMI requires instruction restart of the I/O instruction, and consequently, the SMM handler is invoked prior to invoking the debug exception handler. Alternatively, executing the SMM handler first requires that the information concerning the debug exception is not lost.

TABLE 1

| Current Instruction | Single Step Trap | Data Breakpoint Trap | Synchronous SMI | Asynchronous SMI | Instruction Restart Required |
|---|---|---|---|---|---|
| Non-I/O instruction | Yes | — | N/A | Yes | No |
| Non-I/O instruction | No | Yes | N/A | Yes | No |
| I/O instruction | Yes | — | Yes | — | Yes |
| I/O instruction | No | Yes | Yes | — | Yes |
| I/O instruction | Yes | — | No | Yes | No |
| I/O instruction | No | Yes | No | Yes | No |

Figures 4A, 4B:
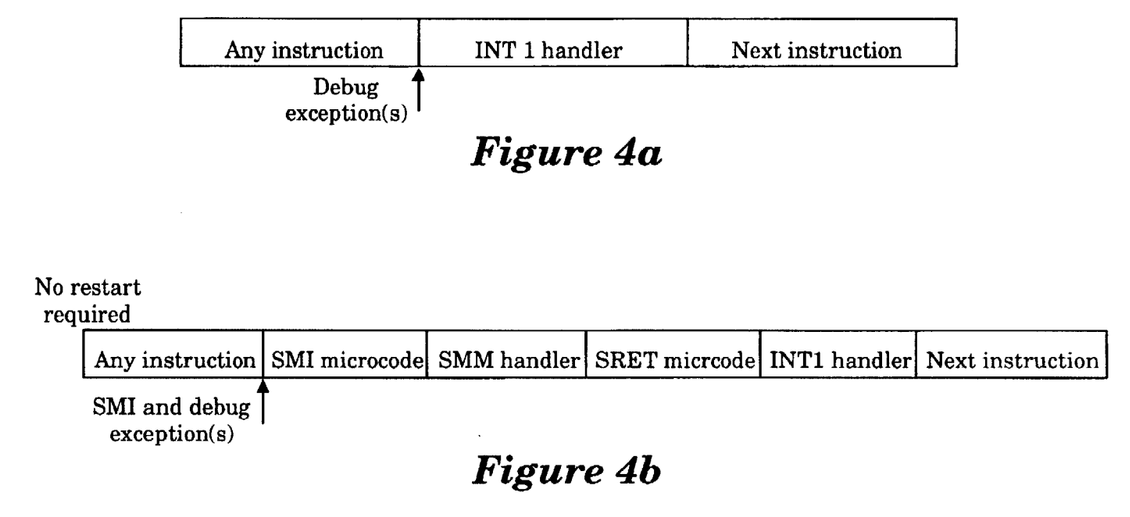
FIGS. 4a–c illustrate instruction flow for three possible scenarios for detecting debug exceptions and SMIs in a microprocessor configured in accordance with the present invention.
Figure 4C:
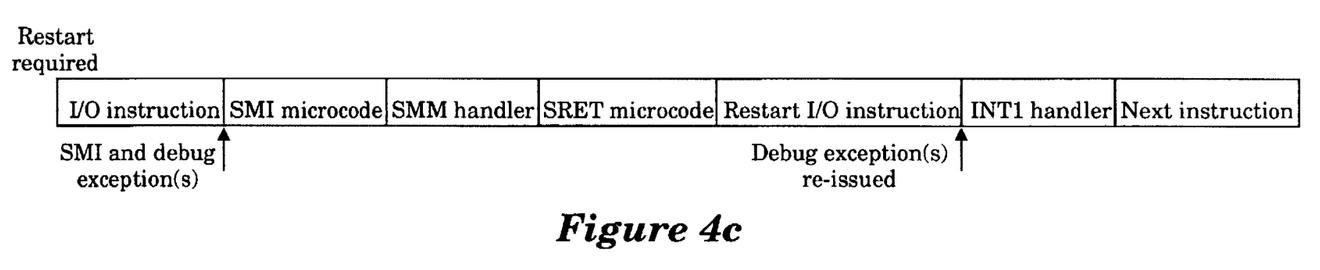

FIGS. 4a–c illustrate instruction flow for three possible scenarios for detecting debug exceptions and SMIs in a microprocessor configured in accordance with the present invention. FIG. 4a illustrates instruction flow in the microprocessor 110 when a debug exception is encountered and no SMI occurs in the same instruction. Regardless of the instruction type, and after detecting the debug exception, the microprocessor invokes the INT1 handler at the instruction boundary. After completing the INT1 handler, the microprocessor 110 executes the next instruction as indicated by the instruction pointer. Because the microprocessor only detected a debug exception, a conflict between servicing the debug exception and the SMI does not occur.

FIG. 4b illustrates instruction flow in a microprocessor configured in accordance with the present invention wherein a debug exception and SMI, with no restart, occur in the same instruction. For the scenario illustrated in FIG. 4b, the microprocessor detects the SMI and debug exception after executing an instruction. Because the SMI contains a higher priority than the debug exception, the microprocessor 110 services the SMI first. In order to service the SMI, the microprocessor 110 executes the SMI microcode routine. The SMI microcode routine invokes the SMM handler to service the SMI, and upon completion of the SMM handler, the microprocessor 110 executes a SRET microcode routine. In order to service the debug exception, the microprocessor 110 executes the INT1 handler routine. After executing the INT1 handler, the microprocessor 110 executes the next instruction as indicated by the instruction pointer. For the scenario illustrated in FIG. 4b, instruction restart is not required.

FIG. 4c illustrates instruction flow in a microprocessor configured in accordance with the present invention wherein a debug exception and SMI with restart occur in the same instruction. For the scenario illustrated in FIG. 4c, the instruction executed is an I/O instruction and requires instruction restart. In order to service the SMI first, the microprocessor 110 executes the SMI microcode, SMM handler, and the SRET microcode. After servicing the SMI, the I/O instruction is restarted, and consequently the debug exception is recognized. In order to service the debug exception, the INT1 handler is invoked. The microprocessor 110 executes the next instruction as indicated by the instruction pointer.

Figure 5A:
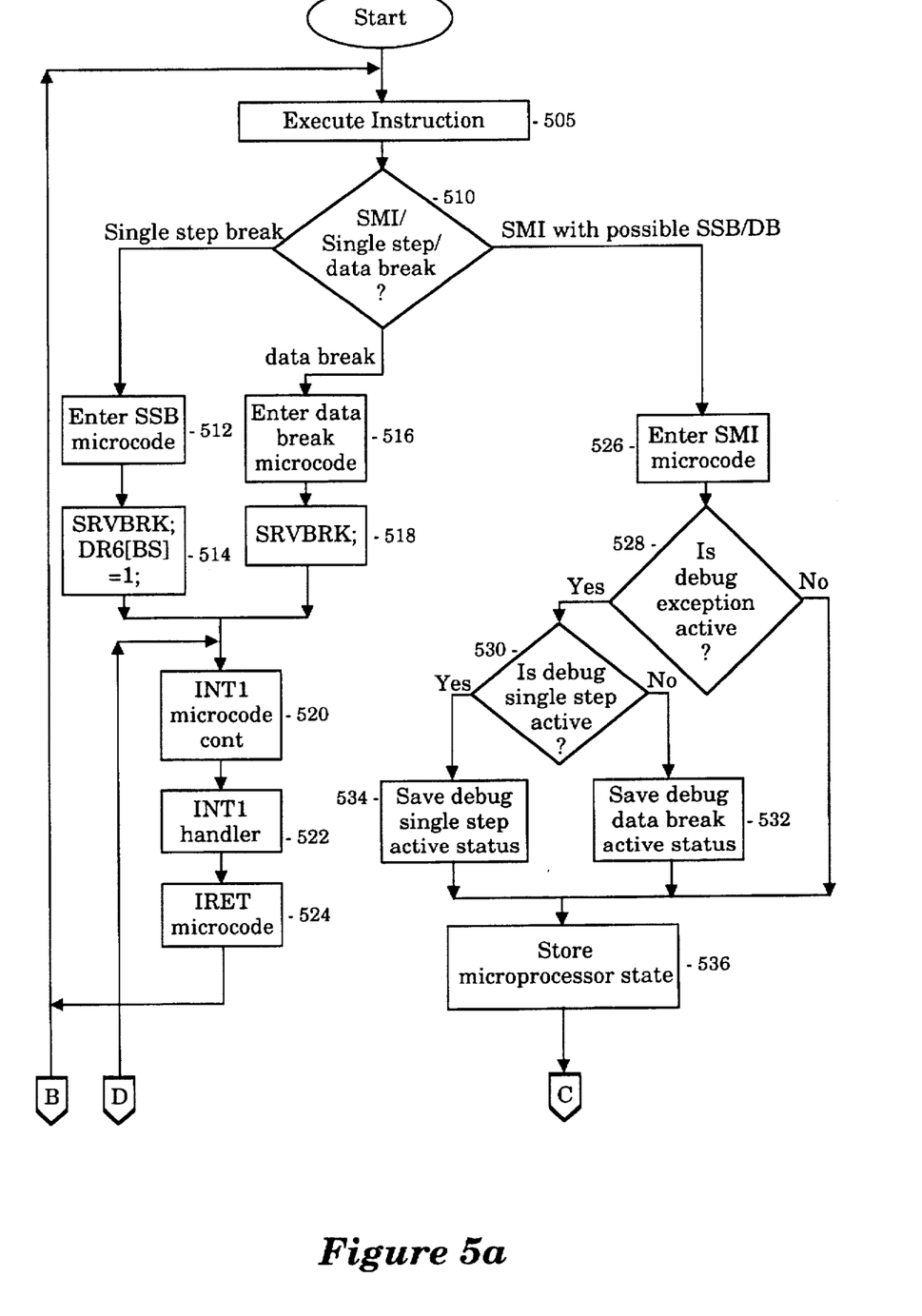
FIG. 5 illustrates a flow diagram for instruction flow in a microprocessor for servicing SMI and debug exceptions in accordance with the present invention.
Figure 5B:
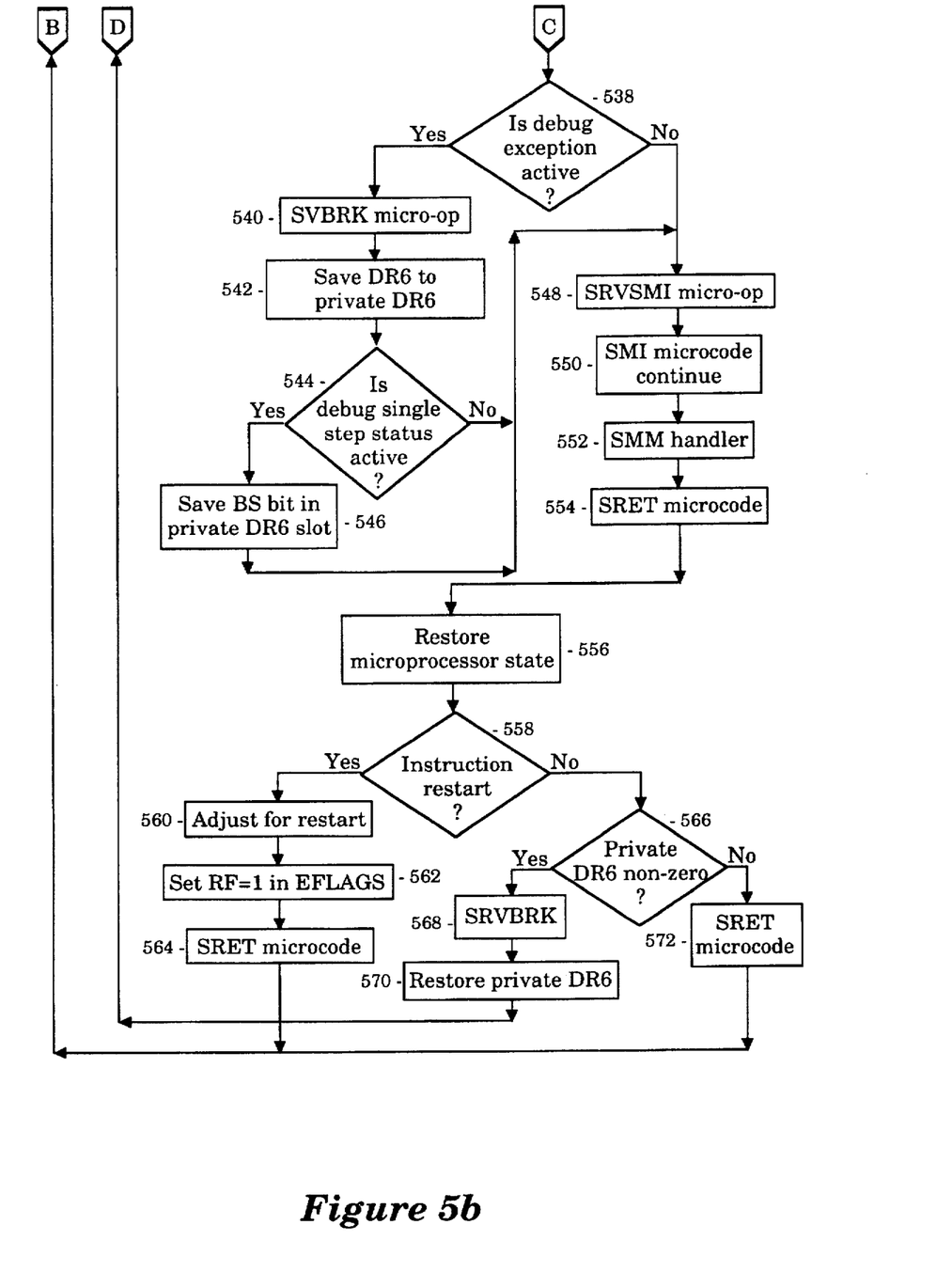

Referring to FIG. 5, a flow diagram for instruction flow in a microprocessor for servicing SMI and debug exceptions in accordance with the present invention is illustrated. Although the flow diagram of FIG. 5 illustrates instruction flow for debug exceptions and SMI, such as I/O traps, one will appreciate that additional instructions for servicing other interrupts may be incorporated without deviating from the spirit and scope of the invention. After executing each instruction, at the instruction boundary word (IBW), the method of the present invention determines whether a SMI or debug exception, (e.g. single step breakpoint or data breakpoints), occurred during execution of the current instruction as shown in block 510. The detection of SMI and debug exceptions is determined from the state of the micro flags 330.

If a SMI and debug exception occurred during execution of an instruction, then the method services the SMI first because of the relative priorities assigned. If a SMI occurred, then the SMI microcode routine is executed as shown in block 526. In block 528, the method determines whether a debug exception also occurred during the same instruction. In a preferred embodiment, the method utilizes two separate micro flags to indicate an active status for the debug single step and debug data breakpoints exceptions. If a debug exception also occurred, then the method determines whether the debug exception is a single step breakpoint or data breakpoint exception as shown in block 530. Block 530 is required because if both debug single step and debug breakpoints are present simultaneously, then the debug single step breakpoint receives a higher priority.

The method saves the debug exception active status for either a single step break or a data break via a microflag as shown in blocks 534 and 532, respectively. In addition, SM flags are set so that the SRET microcode routine readily determines which debug exception routine receives control. In general, the SM flags distinguish between debug single step and debug data break exceptions. A SMRAM slot is allocated for these SM flags. In an alternative embodiment, if SM flags are not utilized, then the SRET microcode routine determines if a debug data break is pending by checking the LN/GN/BN bits in the DR6/DR7 debug registers. If the debug data break exception or debug single step exception is not active, then no status is saved.

In order to service the SMI, the microprocessor 110 saves the current state of the internal registers as shown in block 536. In a preferred embodiment, the microprocessor 110 dumps the current state to SMRAM. The contents of the DR6 register are saved prior to checking the debug data break micro flag, because when the microprocessor state is dumped, DR7 is cleared. The debug data break micro flag is also cleared after the microprocessor state is dumped. Consequently, the microprocessor state is saved subsequent to checking the debug data break point microflag. The method determines whether a debug data break or debug single step status is active as shown in block 538. If a debug exception is active, then a service break (SRVBRK) micro operation is executed, in part, to latch the breakpoint status into the DR6 register as shown in block 540. The breakpoint status, latched into the DR6 register, is saved to a private DR6 register as shown in block 542. In a preferred embodiment, the private DR6 register resides in the SMRAM slot allocated for the SM flags.

If the debug single step status is active, then the microprocessor saves the contents of the BS bit in the private DR6 register as shown in blocks 544 and 546. At this point, the private DR6 register contents contain updated breakpoint status corresponding to the trapped instruction. The private DR6 cannot be overwritten to the public DR6 in SMRAM. Subsequently, if instruction restart is required, then the contents of public DR6 are utilized. Alternatively, if no instruction restart is required, then the debug exception handler is executed, and the contents of private DR6 are required to reflect the correct breakpoint status. After saving the breakpoint status in the private DR6 register, the microprocessor executes a service SMI (SRVSMI) micro operation to begin servicing the SMI as shown in block 548. As shown in blocks 538 and 548 in FIG. 5, if no debug exception occurred, then the microprocessor executes the SRVSMI micro operation without saving the contents of the public DR6 register to the private DR6 register.

In block 550, the SMI microcode routine is executed. In part, the SMI microcode routine saves the contents of the internal registers of the microprocessor, and invokes the SMM handler. The SMM handler is executed to service the operation that generated the SMI as shown in block 552. After completion of the SMM handler, the microprocessor executes the SRET microcode routine to restore the microprocessor state held prior to execution of the SMM handler. If the instruction causing the SMI requires instruction restart, then the microprocessor adjusts for the restart, such as resetting the instruction pointer and resetting the internal register of the microprocessor to the state occupied prior to execution of the current instruction as shown in blocks 558 and 560. The RF bit and the EFLAGS are set by the SRET microcode as shown in block 562. Consequently, when an instruction restart is required, the SRET microcode ensures that the RF bit is set so that any debug exceptions that occurred for the trapped instruction previously should not reoccur. If the RF bit is not set, the microprocessor enters the debug exception handler twice for the same instruction. The SRET microcode restores the state of the microprocessor to execute the same instruction as shown in block 564.

If no instruction restart is required, then the contents of the private DR6 are examined to determine whether a debug data breakpoint or a debug single step breakpoint are set as shown in block 566. By evaluating the contents of the private DR6 register, both debug data break and debug single step break are checked. A debug data break may be active during a debug single step. Consequently, even though the debug single step has a higher priority than debug data break, the debug exception handler requires access to the breakpoint status. If the contents of the private DR6 register are non-zero, then the microprocessor executes a SRVBRK micro operation as shown in block 568. The SRVBRK micro operation is executed to capture any debug exceptions that occurred during execution of the instruction. Consequently, the microprocessor state is restored to permit entry into the debug exception microcode under normal conditions. In block 570, the private DR6 register is restored to reflect current breakpoint status. As shown in the flow diagram of FIG. 5, the microprocessor services the debug exception by executing the INT1 microcode, the INT1 handler, and the IRET microcode. Alternatively, if the contents of the private DR6 register are zero, indicating that no debug exceptions are pending, then the microprocessor executes the SRET microcode as shown in block 572. Upon completion of the SRET routine, the microprocessor executes the next instruction as indicated by the instruction pointer.

After executing the instruction as illustrated in block 505, and if no SMI occurred but a debug exception exists, then the method determines whether the debug exception is a debug single step breakpoint or a data breakpoint. If the debug exception occurred because of a single step breakpoint, then the method executes a single step break (SSB) microcode routine as shown in block 512. The SSB microcode routine includes a service break (SRVBRK) operation. The SRVBRK operation latches the breakpoint status into the DR6 register so as to freeze the contents of the register. The micro flag single step breakpoint status, (BS) is set high. Alternatively, if the microcode determines that the debug exception detected was caused by a data breakpoint, then the data breakpoint microcode is executed as shown in block 516. Again, the SRVBRK micro operation is executed to latch the breakpoint status contents in the debug register DR6. Regardless of whether the debug exception is caused from a single step break or a data break, the INT1 microcode routine is executed as shown in block 520. The INT1 microcode routine comprises the steps of saving the microprocessor state on the stack, initializing microprocessor registers to predefined values, and relinquishing control to the INT1 handler. The INT1 handler is then executed as shown in block 522. The INT1 handler services the debug exception. After executing the INT1 handler, the microprocessor executes an IRET microcode routine as shown in block 524. In general, the IRET microcode routine restores the microprocessor state to the state held prior to executing the INT1 handler routine.

Although the present invention has been described in terms of specific exemplary embodiments, it will be appreciated that various modifications and alterations might be made by those skilled in the art without departing from the spirit and scope of the invention as set forth in the following claims.

What is claimed is:

1. A method for servicing an I/O trap and a debug exception occurring during execution of a single program instruction, wherein the I/O trap has a higher service priority than the debug exception, the method comprising the steps of:

beginning service of the I/O trap by storing a microprocessor state;

determining whether a debug exception occurred during execution the single program instruction in which the I/O trap occurred and prior to beginning service of the I/O trap;

copying breakpoint status information from a status register to a private breakpoint status register prior to continuing service of the I/O trap, if a debug exception occurred during execution of the single program instruction in which the I/O trap occurred and prior to beginning service of the I/O trap;

completing service of the I/O trap;

restoring the state of the microprocessor;

restarting the single program instruction;

copying the breakpoint status information from the private breakpoint status register to the status register; and servicing the debug exception.

2. The method of claim 1, wherein said at least one debug exception is generated upon detection of a debug single step breakpoint and a debug data breakpoint.

3. The method of claim 1, wherein said I/O trap is generated upon detection of a system management interrupt (SMI).

4. The method of claim 1, wherein the step of servicing said I/O trap comprises the steps of:

executing a service System Management Interrupt (SMI) micro operation;

executing a System Management Mode (SMM) handler; and executing a System Return (SRET) microcode routine to return said state of said microprocessor.

5. The method of claim 1, wherein the step of servicing said debug exception comprises the steps of:

executing an interrupt (INT1) handler; and executing an interrupt return (IRET) microcode routine to return said state of said microprocessor.

6. The method of claim 1, wherein the step of storing the current state of the microprocessor comprises the steps of:

allocating a portion of a memory as a system management random access memory (SMRAM); and storing the current state of said microprocessor in said SMRAM.

7. The method as set forth in claim 6, wherein the step of identifying said at least one debug exception comprises the steps of:

determining an active status for said at least one debug exception;

allocating system management (SM) flags in said SMRAM to indicate said active status;

setting said SM flags so as to indicate whether a debug single step exception is active; and setting said SM flags so as to indicate whether a debug data break exception is active.

8. The method as set forth in claim 6, wherein the step of copying said breakpoint status stored in said debug status register to a private debug status register including specifying said debug exception type comprises the steps of:

allocating said private debug register in said SMRAM;

copying said breakpoint status to said private debug status register in said SMRAM;

allocating a debug status (BS) bit in said private debug status register; and setting said BS bit in said private debug status register when said debug single step status is active.

9. The method as set forth in claim 1, wherein said microprocessor comprises an 80×86 compatible microprocessor.

10. A microprocessor, comprising:

a microprocessor core that generates an I/O trap and a debug exception during execution of a single program instruction, wherein the I/O trap has a higher service priority than the debug exception;

a status register coupled to the microprocessor core;

a private debug status register coupled to the microprocessor core; and a microcode execution block coupled to the microprocessor core, the microcode execution block including microcode for servicing and I/O trap and a debug exception that occur during the execution of the single program instruction, wherein the microcode execution block performs the steps of beginning service of the I/O trap by storing a microprocessor state, determining whether a debug exception occurred during execution the single program instruction in which the I/O trap occurred and prior to beginning service of the I/O trap, copying breakpoint status information from a status register to a private breakpoint status register prior to continuing service of the I/O trap, if a debug exception occurred during execution of the single program instruction in which the I/O trap occurred and prior to beginning service of the I/O trap, completing service of the I/O trap, restoring the state of the microprocessor, restarting the single program instruction, copying the breakpoint status information from the private breakpoint status register to the status register, and servicing the debug exception.

11. The microprocessor as set forth in claim 10, wherein said microprocessor core generates said at least one debug exception upon detection of a debug single step breakpoint and a debug data break point.

12. The microprocessor as set forth in claim 10, wherein said microprocessor core generates an I/O trap upon detection of a system management interrupt (SMI).

13. The microprocessor as set forth in claim 10, further comprising a memory coupled to the microprocessor core and to the microcode execution block, said microcode execution block allocating a portion of said memory as a system management random access memory (SMRAM), and storing the current state of said microprocessor in said SMRAM.

14. The microprocessor as set forth in claim 13, wherein said memory further comprises system management (SM) flags contained within said SMRAM indicating an active status for said debug exception, said microcode execution block setting said SM flags to indicate whether a debug single step exception is active, and setting said SM flags to indicate whether a debug data break exception is active.

15. The microprocessor as set forth in claim 13, wherein said private debug status register resides in said SMRAM, and further comprises a debug status (BS) bit, said microcode execution block setting said BS bit in said private debug status register when said debug single step status is active.

16. The microprocessor as set forth in claim 10, wherein said microprocessor core is compatible with an 80×86 compatible microprocessor.

17. A computer system comprising:

at least one I/O peripheral device;

a bus coupled to said at least one I/O peripheral device;

a system management mode module (SMM) that generates a system management interrupt (SMI) upon occurrence of an I/O trap based on said at least one I/O peripheral device;

a microprocessor coupled to said bus and said SMM module, said microprocessor comprising a microprocessor core that generates an SMI and a debug exception during execution of a single program instruction, wherein the SMI has a higher service priority than the debug exception, a status register coupled to the microprocessor core, a private debug status register coupled to the microprocessor core, and a microcode execution block coupled to the microprocessor core, the microcode execution block including microcode for servicing and SMI and a debug exception that occur during the execution of the single program instruction, wherein the microcode execution block performs the steps of beginning service of the SMI by storing a microprocessor state, determining whether a debug exception occurred during execution the single program instruction in which the SMI occurred and prior to beginning service of the SMI, copying breakpoint status information from a status register to a private breakpoint status register prior to continuing service of the SMI, if a debug exception occurred during execution of the single program instruction in which the SMI occurred and prior to beginning service of the SMI, completing service of the SMI, restoring the state of the microprocessor, restarting the single program instruction, copying the breakpoint status information from the private breakpoint status register to the status register, and servicing the debug exception.

18. The computer system as set forth in claim 17, wherein said microprocessor comprises an 80×86 architecture microprocessor.

* * * * *